United States Patent [19]
Lapeyre

[11] 3,818,704
[45] June 25, 1974

[54] APPARATUS FOR CONVERTING THE ENERGY OF OCEAN WAVES

[75] Inventor: James M. Lapeyre, New Orleans, La.

[73] Assignee: The Laitram Corporation, New Orleans, La.

[22] Filed: June 25, 1973

[21] Appl. No.: 373,395

[52] U.S. Cl. .................................. 60/504, 60/398
[51] Int. Cl. .............................................. F03c 5/02
[58] Field of Search ............................ 60/496–507

[56] References Cited
UNITED STATES PATENTS
1,026,450  5/1912  Neal .................................... 60/504
1,408,094  2/1922  Kersey ................................ 60/500

FOREIGN PATENTS OR APPLICATIONS
564,314  12/1923  France ................................ 60/504
639,766  6/1928  France .................................. 60/507

Primary Examiner—Edgar W. Geoghegan
Assistant Examiner—H. Burks
Attorney, Agent, or Firm—Schiller & Pandiscio

[57] ABSTRACT

Apparatus for converting the energy of surface waves in a liquid such as an ocean, comprising a buoyant helical member mounted for rotation about an axis. The pitch of the helical member approximates the length of the expected waves and the member is floated on the surface with its axis oriented so that each wave traverses the helix lengthwise and buoyantly supports successive sections thereof causing it to rotate about its axis. The helix is coupled with rotary driven means such as an electrical generator.

16 Claims, 6 Drawing Figures

PATENTED JUN 25 1974  3,818,704

APPARATUS FOR CONVERTING THE ENERGY OF OCEAN WAVES

The present invention is concerned with conversion of the energy of ocean waves into useful power and particularly to apparatus adapted to be rotated by ocean waves.

That a tremendous and inexhaustable source of energy is to be found in wind-driven ocean waves is well known and innumerable attempts have been made to convert this energy to a useful form. It has been found that in many sections of the world such as, for example, the west coast of North America, waves approach the coast with great regularity and without interruption over extended periods of time. This has suggested that it might be economically feasible to construct apparatus for converting the available wave energy to a more useful form such as electricity. Waves in water may be termed "gravity waves" and while the waves move horizontally at substantial speeds; e.g., 30 knots, the motion of the water itself is essentially circular or elliptical, except when the wave is caused to break. Wave energy conversion systems employed heretofore have utilized the vertical component of the water motion and/or water movement associated with breaking waves. Such systems are intermittent in their operation and/or have variable energy outputs, while the tremendous wave forces involved, particularly those encountered during storms or as a result of seismic disturbances, have necessitated very substantial and expensive structures.

Another characteristic of ocean waves is their period or wavelength which, over extended periods of time, may, in many locations, deviate only slightly from a particular value. This is significant because it has made possible the achievement of a primary object of the present invention, namely, the provision of a wave energy converter adapted to operate continuously and provide a continuous and substantially constant energy output. This is achieved by virtue of a novel and improved construction that not only utilizes the vertical motion of the water of each wave, but the continuous horizontal motion of the wave itself.

Other objects of the invention are: to provide a wave energy converter as described that is relatively simple and inexpensive; to provide apparatus as described adapted to directly convert wave energy into torque; and to provide a wave energy converter that can be moved to compensate for changes in the direction of wave travel and/or the period of waves, and to avoid damage resulting from storms and the like.

To effect the foregoing and other objects, the present invention generally comprises a buoyant helical member mounted for rotation about its helical axis and adapted to be positioned such that the helical axis is oriented approximately along the mean direction of propagation of the waves. The helical member is coupled to a driven system, such as an electrical generator or friction boiler.

Other objects of the invention will, in part, be obvious and will, in part, appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be made to the following detailed description taken in connection with the accompanying drawings wherein.

Figure 1:
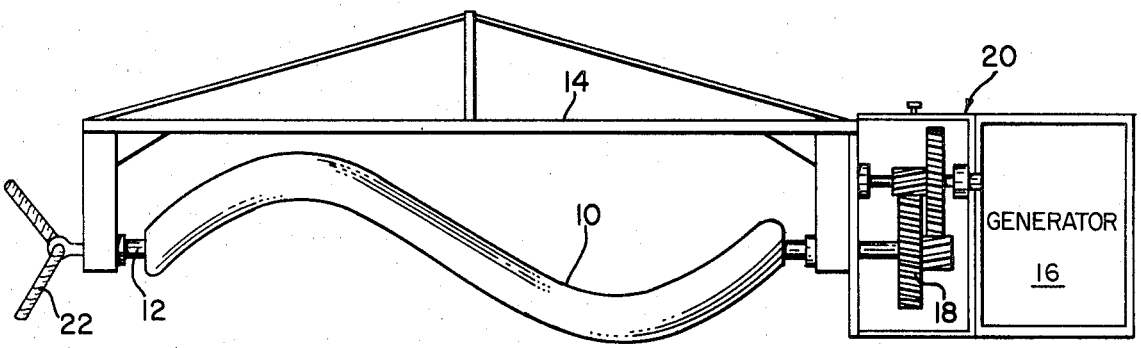
FIG. 1 is a somewhat schematic, elevational view, partially in section, and partially in perspective, illustrating a wave energy converter embodying the invention.

The wave energy converter of the invention is shown in the drawing as comprising means adapted to be rotated directly by ocean waves and power conversion means such as an electrical generator, coupled with the wave rotated means and adapted to be driven thereby. The rotary, wave-driven means include an elongated buoyant member 10 in the form of a helix mounted for rotation about the axis of the helix. Buoyant helical member 10 is constructed so as to displace only a small portion of its volume and may comprise, for example, a tube or it may be formed of a material such as one of the expanded polymers, having a relatively low specific gravity. Member 10 may be self-supporting and rotatably mounted at its ends as shown in FIG. 1 or the helical member, designated 11 in FIG. 2 may be coiled around a supporting shaft 12 and supported at regular intervals throughout its length.

As previously noted, over extended periods of time, the waves approaching a shore may be characterized by a substantially constant period and approach from substantially the same direction. If the period is known or can be predicted accurately, then the wave length and wave velocity are readily computed, being functions of the wave period. For example, it is not unusual to encounter waves having a period of ten seconds which means that the waves travel at a velocity of about 30 knots or 50 feet per second and have a length of the order of five hundred feet. The helical buoyant member 10 is designed to float on the surface of the water while oriented with its helical axis in the direction of wave propagation such that each wave traverses the helical member from end to end buoyantly supporting successive sections of the helical member.

Figure 3A:
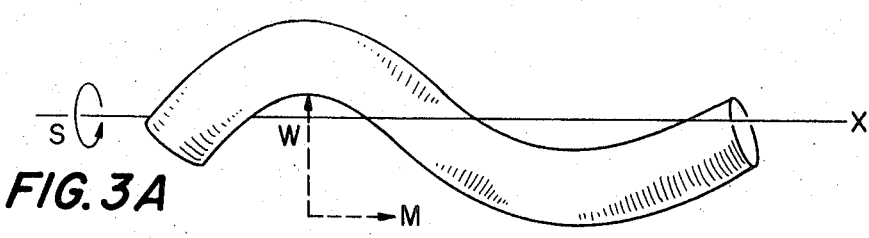
FIG. 3 is a series of views illustrating operation of a buoyant helix of the invention.
Figure 3B:
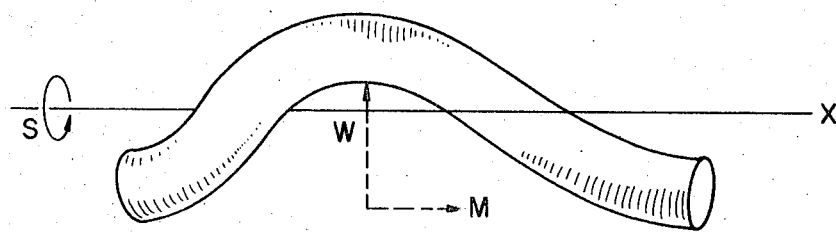
Figure 3C:
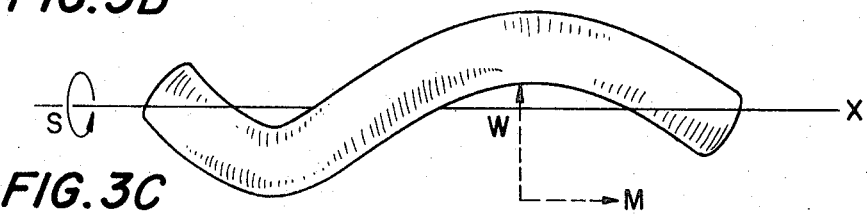

In FIG. 3, there are three successive idealized views A, B, and C, of a helix rotated about an axis X by a wave according to the present invention. In each view, the position of the wave crest is indicated by the broken arrow marked W, the direction of wave propagation is indicated by the broken arrow marked M, and the direction of shaft rotation is indicated by the arrow marked S. It should be noted that as the wave crest progresses from left to right successively from the position shown in view A, to that shown in view B, to finally that shown in view C, the motion of the wave along M raises successive portions of the helical member, causing it to rotate about axis X.

In the preferred embodiment of the apparatus of the invention, the pitch (length of a 360° section) of the helix will be at least approximately equal to the length of the expected waves and will be at least 360° in length. By virtue of this construction, rotation of the helical member will be continuous since a wave will start to transverse the helix immediately as the preceding wave has finished transversing the helix and successive waves will act on sections of the helix spaced 360° apart (the pitch length) so that the two lifting forces, converted into torque by the helical member, act simultaneously and in the same direction.

Figure 2:
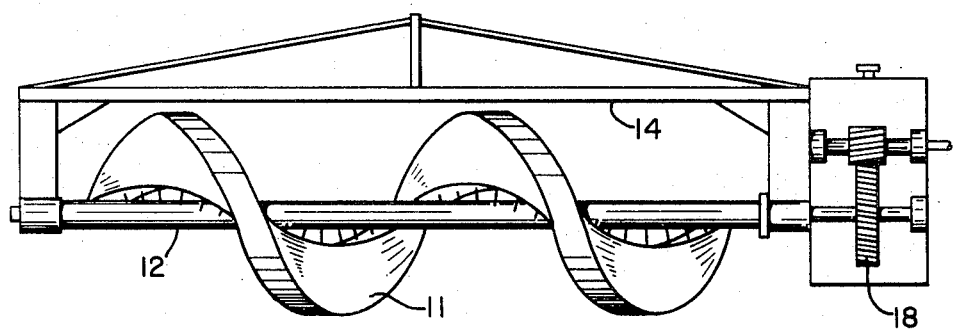
FIG. 2 shows another embodiment of a buoyant helix adapted for incorporation in the apparatus of the invention.

The buoyant helical member may have any convenient cross-section such as circular as shown in FIG. 1, or rectangular as shown in FIG. 2. However, it is important that the helical member have a substantially uniform cross section or buoyancy, throughout at least 360° of its length so that the torsional component of the force exerted on the helix by each wave remains substantially constant as the wave traverses the helix. In this way, rotation of the helical member will be at substantially constant speed as well as continuous, thus making the apparatus more ideally suited for driving means, such as an electrical generator, required to be driven continuously and at constant speed. The end sections of the helical member may be rounded or tapered to promote smoother flow of the waves as they start and finish traversing the helix.

The other components of the apparatus include means for mounting the helical member for rotation about its axis. These means include a frame or supporting truss 14 in which are journaled shafts Section 12 extending from the ends of helical member 10, as shown in FIG. 1, or shaft 12 (shown in FIG. 2) on which helical member 11 is supported.

In an alternative embodiment (not shown), the supporting truss may be eliminated and the helical member mounted for rotation at only one end. For maximum coupling of the helical member to the surface waves, the buoyancy of the helix should be adjusted (by selection of materials, structural weighting or the like) so that in a calm sea, the helical member floats with one-half above water and the other half submerged, the helical axis thus lying in the plane of the water surface. With such a structure, the helical axis will remain near water level for waves of substantial amplitude. If the helical member were either so light that it rode almost completely on the wave crest or so heavy that it were neutrally buoyant and rode completely submerged just below the wave crests, it will be seen that no torque will be produced. The 50 percent buoyant condition is half way between these extremes and gives maximum torque and power output.

The driven energy conversion components of the wave energy converter include, for example, a conventional electrical generator 16 coupled with the helix through a suitable transmission including, for example, speed-up gears 18. The generator and gears or other rotary driven means are mounted and enclosed in a water-tight, buoyant housing 20 coupled with supporting truss 14 or adapted itself, to function as a support for one end of the helical member. Thus, the helical member, the supporting truss and the driven power generator, may be constructed as a buoyant unit that can be moved through the water as any vessel. This permits the converter to be positioned in the most favorable location, oriented as required with respect to the direction of wave travel and moved to a safe place to avoid damage in the event of a storm or other disturbance.

Figure 4:
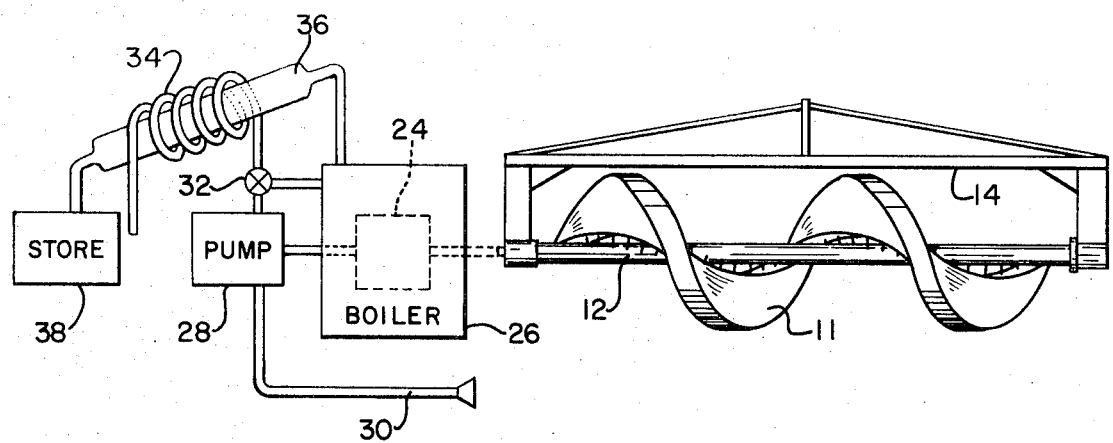
FIG. 4 is a schematic representation showing a system for producing fresh water using the converter of the invention.

It will be appreciated that the wave energy need not be converted into electrical energy, but can be converted to other energy forms and, indeed, put to immediate use. For example, as shown schematically in FIG. 4, the mechanism, such as was shown in FIG. 2, includes helical member 11 mounted on shaft 12 and held in frame 14. The shaft is coupled to a rotary motion-to-heat transducer 24 such as a friction-loaded brake drum or the like, connected by a heat exchanger (not shown) to a sea water boiler 26. Also connected to shaft 12, preferably through suitable gearing is sea-water pump 28. The latter has a sea-water intake line 30 and serves to pump the sea water to valve 32 whence it may be diverted to fill boiler 26 or to traverse cooling coil 34 or both. Coil 34 surrounds distillation in column 36 which is connected at one end to receive water vapor from boiler 26 and at the other end to discharge condensate into storage means 38. If desired, another pump can be coupled to shaft 12 to pump the fresh water from storage means 38. The system shown in FIG. 4 takes advantage of the immediate presence of the sea both as a source of distillable water and as a coolant.

The device of the invention may serve in other capacities connected with the marine environment. For example, instead of driving a heat transducer, it can be coupled to drive a positive displacement type of pump which could be used to entrap fish and drive them into a mesh storage chamber. In such case, an auxiliary pump could be used to macerate a minor proportion of the pumped fish to provide sustenance for the remainder.

When the pitch of the helical member matches the wave length, the helical member is positioned with its axis parallel with the direction of wave travel. This can be accomplished by providing conventional moorings and securing the converter to the moorings by means such as lines 22. The converter may be oriented with either end located toward the source of the waves while housing 20 may be constructed so as to provide minimum interference with wave travel particularly when located toward the source of the waves as would be the case when the housing itself functions as the support for one end of the helical member. Additionally, housing 20 may be provided with suitable ballast, a keel or the like, to prevent axial rotation (capsizing) of the housing and/or to assist in predeterminedly orienting the converter with respect to the direction of the wave travel.

Another advantage of the movable wave energy converter of the invention manifests itself in the situation in which the wave length is less than the pitch of the helical member. In this case, the rotary axis of the helical member can be located at an angle with respect to the direction of wave travel such that the distance between wave crests, measured along the axis of the helix, is equal to the pitch of the helix. In this way, a wave energy converter having a helical member with a fixed pitch may be employed with waves having substantially shorter lengths.

While the wave converter shown and described is designed to float as a unit on the surface, other embodiments including fixed components are considered to fall within the scope of the invention. For example, the supporting truss 14 and/or the housing 20 for the driven power (torque) converter may be buoyed or supported independently of the helical member so that the latter is suspended at its ends at the proper height above the water surface. In embodiments of this type, the supporting truss 14 and/or housing 20 may be mounted so as to be movable only vertically as required to compensate for tide changed and/or variation in wave amplitude. For example, the helical member and/or driven power converter can be mounted on fixed structures mounted on the sea floor and providing for raising and lowering of the helical member as required to position it with a section immersed in the water, or remove it from the water to avoid storm damage. Such fixed structures preferably will also incorporate means for changing the axial direction of the helical member as necessitated by changes in wave direction and length.

The wave energy converter may be constructed essentially as shown, but with a plurality of helical members mounted on the same supporting frame in side-by-side, parallel relation.

It will be apparent from the foregoing description that the wave energy converter of the invention may never be required to withstand the full force of waves as in the case of wave energy converters which cause waves to break, utilize the energy of breaking waves or are located in the region of breaking waves. For this reason and as a result of its mobility, the construction is relatively light and inexpensive as compared with structures which are immobile and, as a result, are subjected to and are designed to withstand severe wave conditions.

The wave converter is responsive to both the horizontal motion of the waves as well as the vertical motion of the water itself so that rotation and energy output are both continuous and substantially constant even though waves arrive at intervals.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for converting the energy of surface waves in a liquid comprising, in combination:
    an elongated, buoyant member curved about an axis to form a helix;
    means mounting said helical buoyant member for rotation about said axis and including means for suspending said helical buoyant member so as to enable said member to float partially submerged with respect to the crests of said surface waves; and
    driven means coupled with said buoyant member for rotation thereby in response to rotation of said member.

2. Apparatus as defined in claim 1 wherein said helix formed by said buoyant member includes at least a 360° section.

3. Apparatus as defined in claim 2 wherein said helix includes at least one additional incremental section of 180°.

4. Apparatus as defined in claim 1 wherein said means mounting said buoyant member include means for rotatably mounting said helix at least near opposite ends thereof.

5. Apparatus as defined in claim 4 wherein said means mounting said buoyant member include means for supporting said buoyant member at spaced intervals throughout its length.

6. Apparatus as defined in claim 1 wherein the buoyancy of said buoyant member is substantially uniform throughout its length.

7. Apparatus as defined in claim 1 wherein said buoyant member has a buoyancy enabling said member to float in said liquid with said axis substantially in the plane of the mean level of said liquid.

8. Apparatus as defined in claim 1 wherein said buoyant member has a buoyancy such that in a calm body of said liquid approximately half of said member is submerged and half of said member extends above the surface of said liquid.

9. Apparatus as defined in claim 2 wherein the cross-section of said buoyant member is substantially uniform throughout its entire length.

10. Apparatus as defined in claim 9 wherein the ends of said buoyant member are tapered.

11. Apparatus as defined in claim 1 wherein said buoyant member has a substantially rectangular cross-section.

12. Apparatus as defined in claim 1 having a net positive buoyancy wherein the net buoyancy of said means mounting said buoyant member are negative.

13. Apparatus as defined in claim 12 further including means for mounting and enclosing said driven means wherein the net buoyance of the remaining components of said apparatus including the last mentioned means is approximately neutral or slightly buoyant.

14. Apparatus as defined in claim 1 including a plurality of said helices, and wherein said helices are supported in said means mounting said buoyant member with the helical axes all in substantially paralled relation.

15. Apparatus as defined in claim 1 further including second support means for mounting said drive means and means for preventing rotation of said second support means.

16. Apparatus as defined in claim 1 including at least one additional helical member mounted on said means mounting said buoyant member with the axis of said additional member being substantially parallel with the axis of the first-mentioned helical member and driven means coupled with said additional helical member.

* * * * *